J. BUSCH.
RIM RETRACTING AND DISTENDING DEVICE.
APPLICATION FILED APR. 2, 1919.
1,324,033.
Patented Dec. 9, 1919.
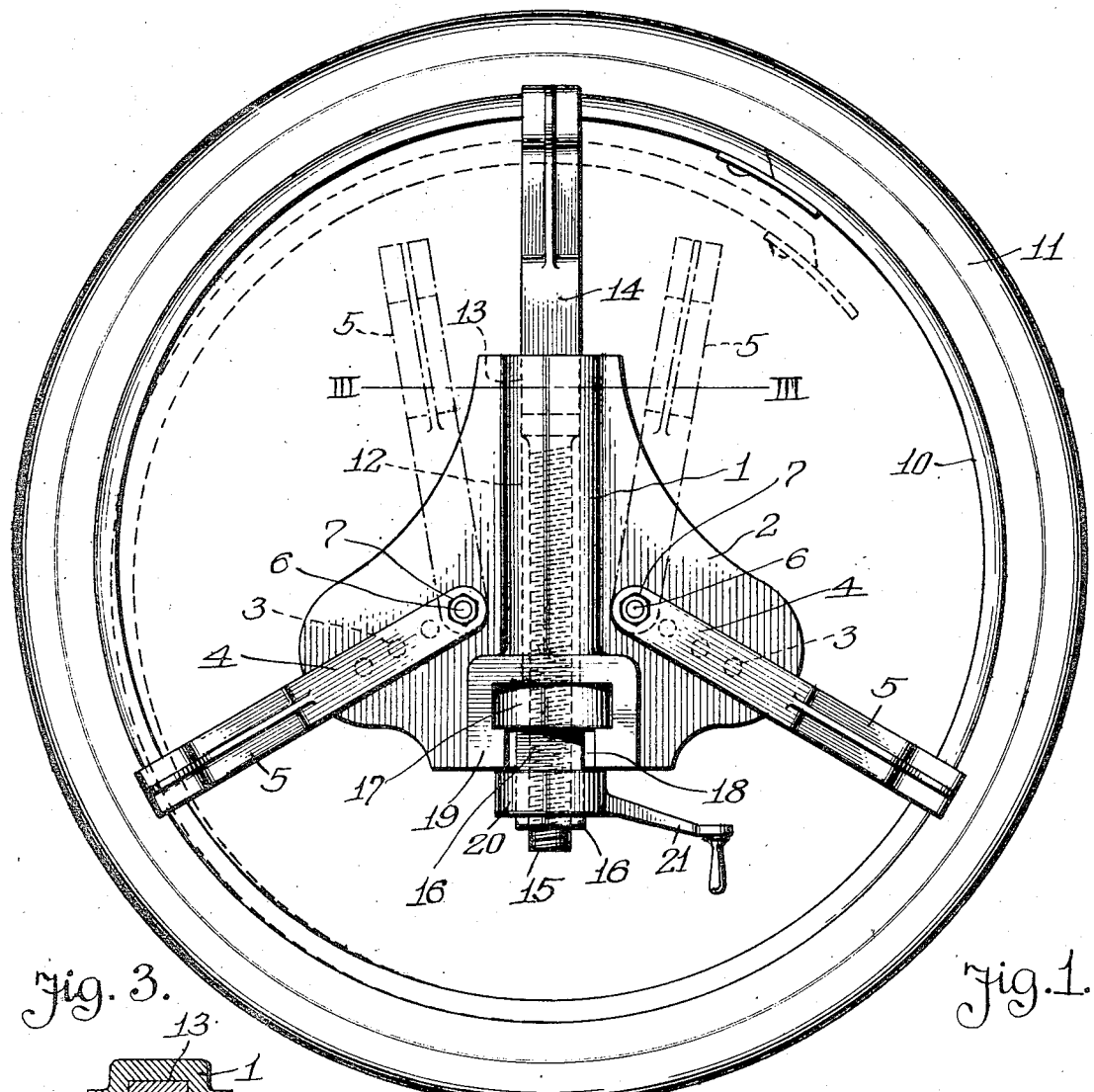
Fig. 1.
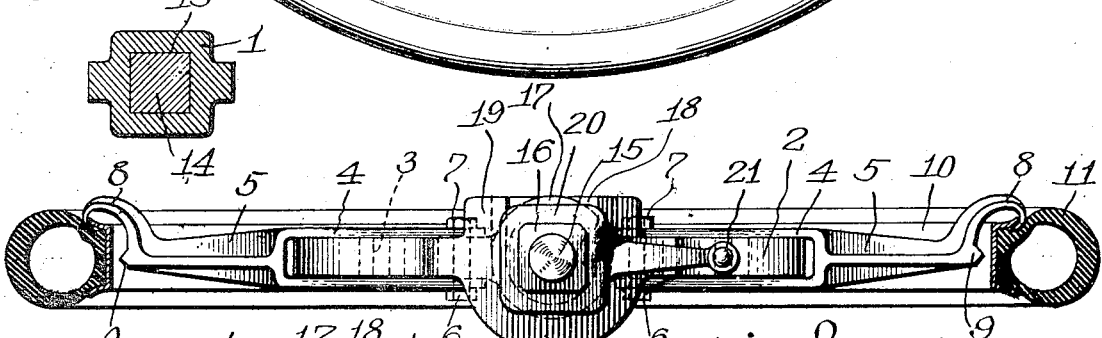
Fig. 3.
Fig. 2.
Fig. 4.
Inventor
Joseph Busch,
By
Attorneys

UNITED STATES PATENT OFFICE.

JOSEPH BUSCH, OF DETROIT, MICHIGAN.

RIM RETRACTING AND DISTENDING DEVICE.

1,324,033.          Specification of Letters Patent.     Patented Dec. 9, 1919.

Application filed April 2, 1919.  Serial No. 286,876.

*To all whom it may concern:*

Be it known that I, JOSEPH BUSCH, a citizen of the United States, residing at Detroit, in the county of Wayne and State of Michigan, have invented certain new and useful Improvements in Rim Retracting and Distending Devices, of which the following is a specification, reference being had therein to the accompanying drawings.

This invention relates to a rim retracting and distending device, and the primary object of my invention is to provide a novel rim tool, wherein positive and reliable means are employed in a manner as hereinafter set forth for gripping or engaging a tire rim so that the same may be adjusted to facilitate placing a tire on the rim or removing the tire therefrom, the tool being especially designed for that type of rim which is split or has interlocked lapped ends which may be shifted relative to each other to retract or distend portions of the rim.

Another object of my invention is to provide a rim tool of the above class which may have portions thereof folded so that the tool will occupy a comparatively small space and may be readily carried as part of a tool kit.

A further object of my invention is to provide a device of the above type wherein the parts are constructed with a view of reducing the cost of manufacture and at the same time retain those features, by which safety, durability, ease of assembling and operation are secured. With such ends in view, my invention resides in the novel construction to be hereinafter considered and then claimed.

Reference will now be had to the drawings, wherein—

Figure 1 is a side elevation of the rim tool, showing the same in position for manipulating a rim, and also illustrating portions of the tool in closed or adjusted positions by dot and dash lines;

Fig. 2 is a bottom plan of the tool applied to a tire rim, showing the tire and the rim thereof in horizontal section;

Fig. 3 is a horizontal sectional view of the tool taken on the line III—III of Fig. 1, and Fig. 4 is a detail sectional view of the screw and nut connection of the tool.

To put my invention into practice, I provide a tubular body 1 with opposed side wings 2, and each wing has a series of apertures 3 which permit of the bifurcated or forked ends 4 of rim engaging arms 5 being pivotally connected to the body wings 2 by bolts 6 and nuts 7 or other fastening means. The pivotal connection between the arms 5 and the body wings 2 permit of the arms 5 being swung into a folded position substantially in parallelism to the tubular body 1, and through the medium of the series of apertures 3 the rim arms 5 may be positioned to engage tire rims of various sizes.

The outer ends of the rim arms 5 terminate in clencher members 8 and bearing members 9, the clencher members 8 being designed to grip the clencher edges of a rim 10 and retract the same, while the bearing members 9 are adapted for engaging the inner wall of the rim 10 and distending said rim. The shape of the outer ends of the rim arms 5 permit of the tool being used for two purposes, and in either instance the rim may be safely handled and without any danger of cracking or unduly bending said rim so that a tire 11 may be easily and quickly removed from the rim 10 or mounted thereon.

The tubular body 1 has its bore 12, at one end thereof, provided with a rectangular portion 13 and slidable in the rectangular portion of said bore is a non-rotatable rim engaging arm 14 which has its outer end constructed similar to the arms 5 and adapted to coöperate with said arms in manipulating the rim 10. The inner end of the arm 14 terminates in a screw 15 in threaded engagement with a nut 16 having a cylindrical head 17 set in the recess 18 of a housing or enlarged portion 19 at one end of the body 1. The cylindrical head 17 of the nut 16 rotatably supports said nut in the housing 19 and compensates for end thrust of the arm 14 relative to the tubular body 1. The recess 18 provides clearance for the nut 16 and said nut is adapted to receive the head 20 of a detachable crank 21, which may be easily and quickly placed on the nut 16 to impart rotation to said nut and cause longitudinal movement of the rim arm 14 relative to the body of the device.

From the foregoing, it will be observed that the crank 21 can be rotated to bodily shift the tool relative to the tire 11 and cause the rim 10 to be either retracted or distended, and with the clencher members 8 engaging one side of the rim, said rim is more or less held with one side thereof greater in diameter than the other side, thus facilitating the placing of said rim in a tire.

While in the drawing there is illustrated a preferred embodiment of my invention, it is to be understood that the structural elements are susceptible to such variations and modifications as fall within the scope of the appended claim.

What I claim is:—

A device of the type described comprising a body having side wings, pivoted rim engaging arms having inner bifurcated ends extending on to and connected to the wings of said body and capable of being adjusted relative thereto, a rim engaging arm slidable in one end of said body and having a screw extending to the opposite end thereof, a housing at the opposite end of said body and having an open side recess, a detachable nut set in the recess of said housing and held against longitudinal displacement and in screwthreaded engagement with the screw of said slidable rim engaging arm, and means rotatable about the axis of the arm screw adapted for rotating said nut to impart longitudinal movement to said slidable rim engaging arm.

In testimony whereof I affix my signature in the presence of two witnesses.

JOSEPH BUSCH.

Witnesses:
  JOSEPH J. BUSCH, Jr.,
  KARL H. BUTLER.